(12) United States Patent
Sasaki

(10) Patent No.: US 8,114,937 B2
(45) Date of Patent: Feb. 14, 2012

(54) CARBON BLACK, METHOD FOR PRODUCING THE SAME, AND ITS USE

(75) Inventor: Yoshio Sasaki, Singapore (SG)

(73) Assignee: Denka Singapore Private Limited, Singapore (SG)

( * ) Notice: Subject to any disclaimer, the term of this patent is extended or adjusted under 35 U.S.C. 154(b) by 776 days.

(21) Appl. No.: 11/997,042

(22) PCT Filed: Jul. 27, 2006

(86) PCT No.: PCT/JP2006/315356
§ 371 (c)(1),
(2), (4) Date: Jun. 11, 2008

(87) PCT Pub. No.: WO2007/013678
PCT Pub. Date: Feb. 1, 2007

(65) Prior Publication Data
US 2010/0160539 A1    Jun. 24, 2010

(30) Foreign Application Priority Data
Jul. 27, 2005   (SG) ................. 200504676-8

(51) Int. Cl.
*C08K 3/04* (2006.01)
*C01B 31/02* (2006.01)
(52) U.S. Cl. .................. 524/577; 423/449.1
(58) Field of Classification Search .......... 524/577; 423/449.1
See application file for complete search history.

(56) References Cited

U.S. PATENT DOCUMENTS 2,914,418 A    11/1959   Eastman et al.
2005/0031527 A1*    2/2005   Ohsaki .................. 423/447.3

FOREIGN PATENT DOCUMENTS

EP    1 288 161    3/2003
GB    2 071 072    9/1981

OTHER PUBLICATIONS

H. M. Cheng, et al. "Large-Scale and Low-Cost Synthesis of Single-Walled Carbon Nanotubes by the Catalytic Pyrolysis of Hydrocarbons", Applied Physics Letters, vol. 27, No. 25, XP 000771129, 1998.
Office Action issued Oct. 25, 2010 in Chinese Application No. 200680027673.X (With Partial English Translation).

* cited by examiner

*Primary Examiner* — Robert D. Harlan
(74) *Attorney, Agent, or Firm* — Oblon, Spivak, McClelland, Maier & Neustadt, L.L.P.

(57) ABSTRACT

A carbon black having excellent conductivity-imparting ability, a method for producing the same, and a conductive composition containing the same are disclosed. The carbon black comprises a chain body comprising (1) chain parts of spherical carbon particles and (2) chain parts of rod-shaped carbon particles, the chain part (1) and the chain part (2) being connected, and is produced by supplying a raw material mixture comprising acetylene gas, hydrocarbon and a catalyst for carbon nanotube formation to a high temperature field having a temperature equal to or higher than a thermal decomposition temperature of the hydrocarbon, and heat treating the mixture, or by supplying hydrocarbon containing a catalyst for carbon nanotube formation, during pyrolysis of acetylene gas and/or in the state that acetylene gas has been pyrolyzed, and heat treating the resulting mixture at a temperature equal to or higher than a thermal decomposition temperature of the hydrocarbon.

6 Claims, 2 Drawing Sheets

CHAIN PART (1)

CHAIN PART (2)

200nm

CARBON BLACK, METHOD FOR PRODUCING THE SAME, AND ITS USE

TECHNICAL FIELD

The present invention relates to carbon black, a method for producing the same, and its use.

BACKGROUND ART

Conventionally, conductivity has been imparted to rubbers, resins or the like by containing carbon black therein. In particular, acetylene black has a chain structure of spherical carbon particles, and therefore has excellent conductivity-imparting ability as compared with general carbon black. For this reason, acetylene black is widely used. However, recently it is required to impart far high conductivity to resins or the like. Further, the maximum amount of carbon black that can be compounded without deteriorating inherent physical properties of resins or the like is substantially fixed. In view of those facts, it is considered at the present stage the only way to satisfy the requirement is to develop carbon black having markedly excellent conductivity-imparting ability.

DISCLOSURE OF THE INVENTION

KETJEN BLACK (registered trademark, a product of Ketjen Black International Co.) is considered to have a conductivity-imparting ability about 2 times that of acetylene black, but is extremely expensive.

Accordingly, one object of the present invention is to provide a carbon black having a conductivity-imparting ability comparable to that of KETJEN BLACK.

Another object of the present invention is to provide a method for producing the carbon black.

Still another object of the present invention is to provide a composition comprising resins and/or rubbers, and the carbon black compounded therewith.

The present invention provides a carbon black comprising a chain body which comprises (1) chain parts of spherical carbon particles and (2) chain parts of rod-shaped carbon particles, the chain part (1) and the chain part (2) being connected.

In a preferred embodiment of the carbon black, the chain part of the spherical carbon particles comprises acetylene black, and the chain part of the rod-shaped carbon particles comprises a carbon black other than acetylene black.

The present invention also provides a carbon black powder comprising the above-described carbon black and carbon black other than the above-described carbon black.

In a preferred embodiment of the carbon black powder, the above-described carbon black is contained in an amount of 10% by weight or more based on the weight of the carbon black powder.

The present invention further provides a method of producing a carbon black, comprising supplying a raw material mixture comprising acetylene gas, hydrocarbon and a catalyst for carbon nanotube formation to a high temperature field having a temperature equal to or higher than a thermal decomposition temperature of the hydrocarbon, and heat treating the mixture.

The present invention also provides a method of producing a carbon black, comprising supplying hydrocarbon containing a catalyst for carbon nanotube formation, during pyrolysis of acetylene gas and/or in the state that acetylene gas has been pyrolyzed, and heat treating the resulting mixture at a temperature equal to or higher than a thermal decomposition temperature of the hydrocarbon.

The present invention further provides a composition comprising resins and/or rubbers, and the carbon black or carbon black powder of the present invention compounded therewith.

The carbon black or carbon black powder according to the present invention has excellent conductivity-imparting ability as compared with the conventional acetylene black. As a result, even though the amount of the carbon or carbon powder to be compounded with resins or the like is decreased as compared with the amount of the conventional acetylene black compounded, a composition comprising resins and/or rubber, having the conductivity comparable to that of the conventional composition can be provided. Further, according to the method of producing the carbon black of the present invention, the carbon black or carbon black powder according to the present invention can easily be produced.

BEST MODES OF CARRYING OUT THE INVENTION

Figure 1:
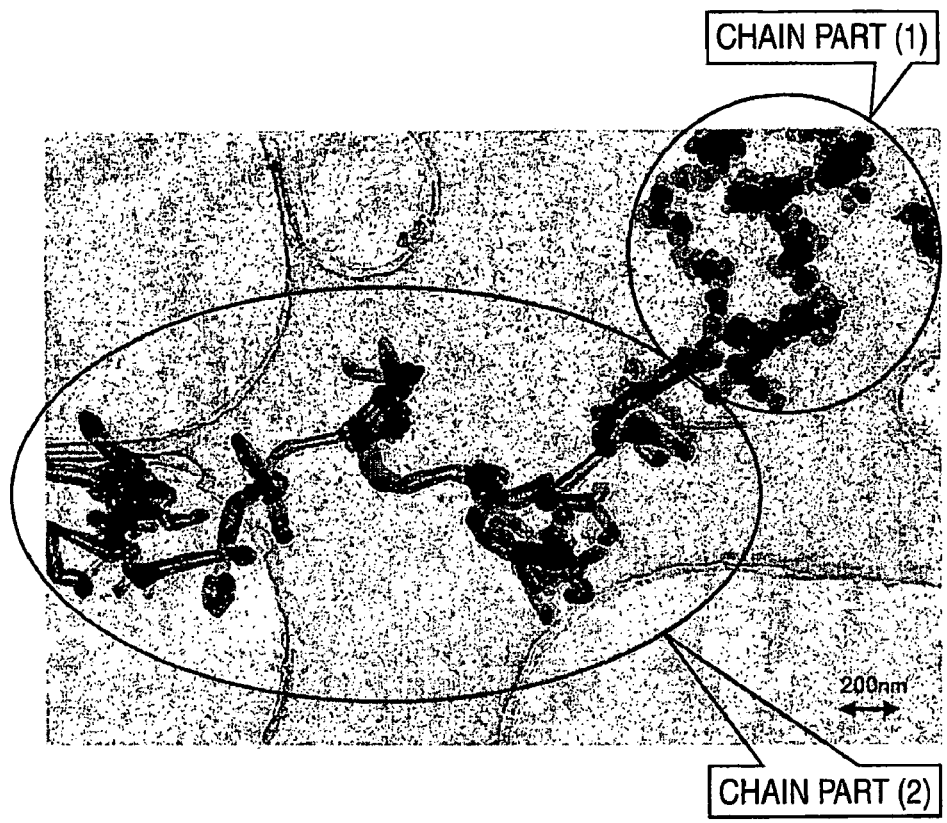
FIG. 1 is an electron micrograph (magnification: 50,000) showing one example of the structure of carbon black according to the present invention.
Figure 2:
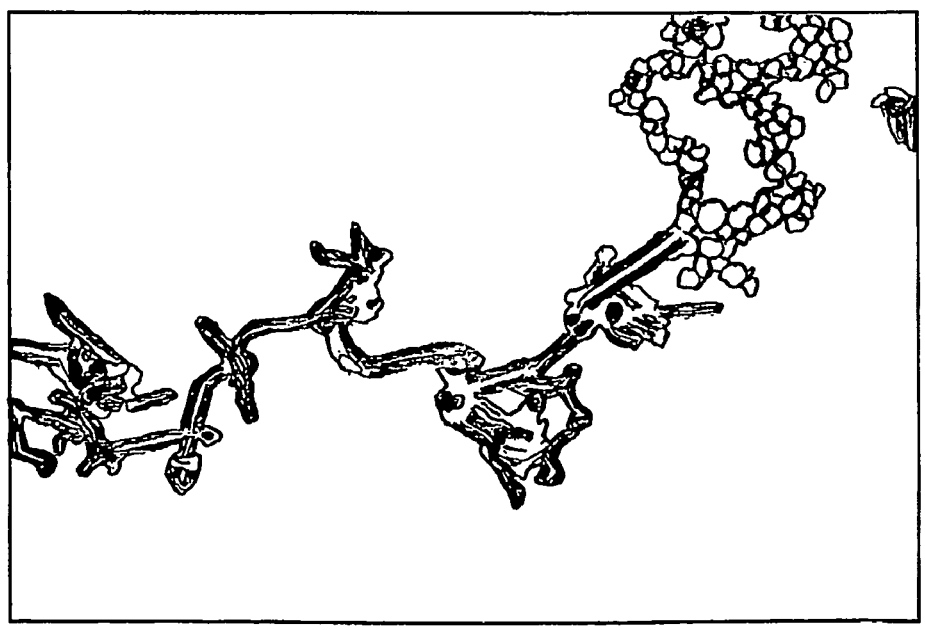
FIG. 2 is a view tracing the electron micrograph of FIG. 1.

The carbon black of the present invention comprises a chain body comprising (1) chain parts of spherical carbon particles and (2) chain parts of rod-shaped carbon particles, the chain part (1) and the chain part (2) being connected, as shown in FIGS. 1 and 2. The carbon black of the present invention has a unique structure as compared with acetylene black constituted of only the chain part (1) of spherical carbon particles. The chain part (1) of spherical carbon particles preferably has a structure such that a plurality of spherical carbon particles having a particle diameter of preferably 10-200 nm, more preferably 20-100 nm, are chained, similar to the chain structure of the conventional acetylene black. On the other hand, the chain part (2) of rod-shaped carbon particles preferably has a structure such that a plurality of fibrous particles having a length of preferably 0.1-1,000 μm, more preferably 0.2-100 μm, and an aspect ratio, a length/diameter ratio, of preferably 2 or more, more preferably 5 or more, are chained.

The number of the connecting portion between the chain part (1) of spherical carbon particles and the chain part (2) of rod-shaped carbon particles may be at least one. Length of the chain part (1) of spherical carbon particles is preferably 5-99%, more preferably 10-95%, per the entire length of one chain body. The preferable embodiment of the carbon black according to the present invention is that the carbon black comprising the chain part of spherical carbon particles comprises acetylene black, and the chain part of the rod-shaped carbon black comprises carbon black other than acetylene carbon black. The carbon black of the present invention can be produced by the method for producing the carbon black according to the present invention described hereinafter.

The carbon black powder of the present invention comprises a mixture of the carbon black of the present invention and carbon black other than the carbon black of the present invention. Examples of the carbon black other than the carbon black of the present invention include acetylene black, furnace black, ketjen black, and carbon black constituted of only a fibrous portion (2) of the carbon black of the present invention. The carbon black powder of the present invention contains the carbon black of the present invention in an amount of preferably 10-100% by weight, more preferably 20-100% by weight, based on the weight of the carbon black powder.

The carbon black powder of the present invention can be produced by producing the carbon black of the present invention, and mixing the carbon black thus produced with carbon black other than the carbon black of the present invention. The carbon black powder of the present invention can further be produced by selecting conditions in the method for producing the carbon black according to the present invention described hereinafter.

The method of producing carbon black according to the present invention comprises supplying a raw material mixture comprising acetylene gas, hydrocarbon and a catalyst for carbon nanotube formation to a high temperature field having a temperature equal to or higher than a thermal decomposition temperature of the hydrocarbon, and heat treating the mixture.

Examples of the hydrocarbon that can be used include saturated hydrocarbons such as methane, ethane, propane or butane; unsaturated hydrocarbons having double bond such as ethylene, propylene, butene or butadiene; unsaturated hydrocarbons having triple bond such as acetylene, propyne or butyne; and aromatic hydrocarbons such as benzene, toluene or xylene. Of those, the aromatic hydrocarbons are liquid at room temperature, and are easily mixed previously with the catalyst for nanotube formation. For this reason, the aromatic hydrocarbons are particularly preferably used.

Fine particles such as Co, Ni, Fe, Mo, S, V or Cr can be used as the catalyst for nanotube formation. Of those, organic materials such as ferrocene or thiophene are soluble in an aromatic hydrocarbon such as benzene, and are easily handled. Further, an element contained in the compound is atom size, and therefore effectively acts as a catalyst in a reaction field as compared with fine particles. For this reason, the organic materials are particularly preferably used.

One example in proportion of each component in the raw material mixture comprising acetylene gas, hydrocarbon and a catalyst for nanobube formation is that acetylene gas is 40-99% by weight, hydrocarbon other than acetylene gas is 1-60% by weight, and the catalyst for nanotube formation is 5-20 parts by weight per 100 parts by weight of the hydrocarbon. One example of temperature in high temperature field is 500-2,000° C.

The preferred embodiment in the production method of the present invention is that the hydrocarbon is supplied during pyrolysis of acetylene gas and/or in the state that acetylene gas has been pyrolyzed, and the resulting mixture is heat treated at a temperature equal to or higher than the thermal decomposition temperature of the hydrocarbon used.

The chain part (2) of rod-shaped carbon particles is generally produced at 500-2,000° C. The chain part (2) has a property to be easily produced at lower temperature. Therefore, the chain part (2) is produced at a temperature of preferably 500-1,700° C., more preferably 500-1,500° C. On the other hand, acetylene gas has a pyrolysis temperature (i.e., formation temperature of the chain part (1) of spherical carbon particles) of about 2,000° C. Therefore, rather than mixing acetylene gas, hydrocarbon and a catalyst for nanotube formation and supplying the resulting raw material mixture to a high temperature field, or supplying hydrocarbon containing a catalyst for nanotube formation during pyropysis of acetylene gas, it is preferable that acetylene gas is supplied to a high temperature filed and pyrolyzed to form the chain part (1) of spherical carbon particles, hydrocarbon containing a catalyst for nanotube formation is supplied to a region of 500-2,000° C. in the same reaction vessel to form rod-shaped carbon chain part, and the respective parts are connected and grown in the same reaction vessel.

For example, it is preferable that the conventional production apparatus of acetylene gas (as described in, for example, JP-A-56-93765) is used, acetylene gas is supplied from an upper side of such a vertical pyrolyzer, and gasified hydrocarbon containing a catalyst for nanotube formation is supplied, accompanying with a carrier gas such as hydrogen, from an optional portion having its environmental temperature of 500-2,000° C. In particular, where the gasified hydrocarbon containing a catalyst for nanotube formation is supplied from the portion further upper the acetylene supply portion, such a further upper portion is a region having a temperature lower than the pyrolysis temperature field of acetylene gas. As a result, the chain part of rod-shaped carbon particles is further effectively formed. Further, the chain part of rod-shaped carbon particles thereafter flows down in the pyrolyzer, contacts with the chain part of spherical carbon particles in the pyrolysis region of acetylene gas, and then passes through a further higher temperature region than the formation region of the chain part of rod-shaped carbon particles. This enables crystallinity of the chain part of rod-shaped carbon particles to increase. Of course, the gasified hydrocarbon containing a catalyst for nanotube formation may be introduced into a 500-2,000° C. region lower than the introduction portion of acetylene gas. Carbon black thus formed is collected by a collection apparatus such as cyclone, bag filter or electric collector. If required and necessary, the carbon black is then purified with, for example, acid treatment.

In the production method of the present invention, a size of spherical particles in the chain part (1) of spherical carbon particles, and a length of the chain part can be controlled by, for example, changing the amount of acetylene gas introduced, or the amount of hydrocarbon introduced, and a size of rod-shaped particles in the chain part (2) of rod-shaped particles, and a length of the chain part can be controlled by, for example, changing the amount of hydrocarbon introduced, the amount of a catalyst for nanotube formation used, or supply position of those.

The composition of the present invention comprises at least one of resins and rubber, and the carbon black or carbon black powder of the present invention mixed therewith. On example of the mixing method is that the raw materials are mixed with a mixer such as a blender or Henschel mixer, and if required and necessary, the resulting mixture is further kneaded with, for example, heat rolls, a kneader or a single-screw or twin-screw extruder. One example of mixing proportion is that the carbon black is used in an amount of 5-150 parts by weight per 100 parts by weight of at least one of resins or rubber.

The resins that can be used are general-purpose plastics, general-purpose engineering plastics, superengineering plastics and other resins. Examples of the general-purpose plastics include olefinic resins (such as polyethylene, ethylene/vinyl acetate resin, ethylene/vinyl alcohol resin, polymethyl pentene or cyclic olefin copolymer), vinyl chloride resins (such as polyvinyl chloride or ethylene/vinyl chloride resin), styrenic resins (such as polystyrene, styrene/acrylonitrile resin or acrylonitrile/butadiene/styrene resin), and acrylic resins (such as methyl polymethacrylate). Examples of the general-purpose engineering plastics include thermoplastic polyesters (such as polyethylene terephthalate or polybutylene terephthalate), polyamides, polyacetals, polycarbonates and modified polyphenylene ethers. Examples of the superengineering plastics include fluorine-containing resins (such as polytetrafluoroethylene or polyvinylidene fluoride), polyphenylene sulfides, liquid crystal polymers, polyacrylates, thermoplastic polyimides, ketone resins and slfone resins. Examples of the other plastics include phenolic resins, urea resins, melamine resins, unsaturated polyesters, alkyld resins, silicone resins, epoxy resins, urethane resins, polyvinyl esters, polyimides, furan resins, xylene resins, thermosetting reinforced plastics and polymer alloys.

Examples of the rubbers that can be used include natural rubbers, styrene-butadiene rubbers, acrylonitrile-butadiene rubbers, butyl rubbers, acrylic rubbers, ethylene-propylene rubbers, ethylene-propylene terpolymers, ethylene-α-olefin copolymer rubbers, silicone rubbers, fluorine rubbers, thermoplastic elastomers (such as polyester), chloroprene rubbers, polybutadiene rubbers, hydrin rubbers, and chlorosulfonated polyethylene.

(1) Volume resistivity: Carbon black and PS resin (trade name: H700, a product of Toyo Styrene Co.) were blended in proportions shown in Table 2 below. The resulting blend was kneaded with a kneader (trade name: LABO PLASTO MILL, a product of Toyo Seiki Seisaku-Sho, Ltd.) the number of blade revolution of 30 rpm at a temperature of 150° C. for 10 minutes. The resulting kneaded product was heated to 200° C., and molded under pressure of $9.8 \times 10^6$ Pa to obtain a test piece having a size of 2×20×70 mm. Volume resistivity of this test piece was measured using a digital multimeter (trade name: DEGITAL MULTIMETER 7562, a product of Yokogawa Electric Corporation) according to SRI 2301.

(2) The test piece used in measurement of volume resistivity was cut into a size of 2×5×5 mm. Using the cut piece, weight (MFI) of a resin composition per 10 minutes flown from a nozzle having an inner diameter of 2 mm was measured with a flowability measuring device (trade name: MELT INDEXER A-111, a product of Toyo Seiki Seisaku-Sho, Ltd.) under heating at 200° C. and a load of 5 kg. The results obtained are shown in Table 2 below.

TABLE 2

|  |  | Experiment No. | | | | | | | |
|---|---|---|---|---|---|---|---|---|---|
|  |  | 1 | 2 | 3 | 4 | 5 | 6 | 7 | 8 |
| Carbon Black | Kind | Ex. 1 | Ex. 1 | Ex. 1 | Ex. 2 | Ex. 3 | Com. Ex. | Com. Ex. | Ketjen Black EC |
|  | Parts by weight | 5 | 10 | 20 | 20 | 20 | 5 | 20 | 10 |
| PS resin | Parts by weight | 95 | 90 | 80 | 80 | 80 | 95 | 80 | 90 |
| Volume resistivity | Ω·cm | 390 | 42 | 4 | 31 | 2 | 1,100 | 45 | 46 |
| MFI | g/10 min | 30 | 8 | 4 | 3 | 5 | 25 | 3 | 1 |

The present invention is described in more detail by reference to the following Examples, but it should be understood that the invention is not construed as being limited thereto.

Examples 1 to 3 and Comparative Example

Figure 3:
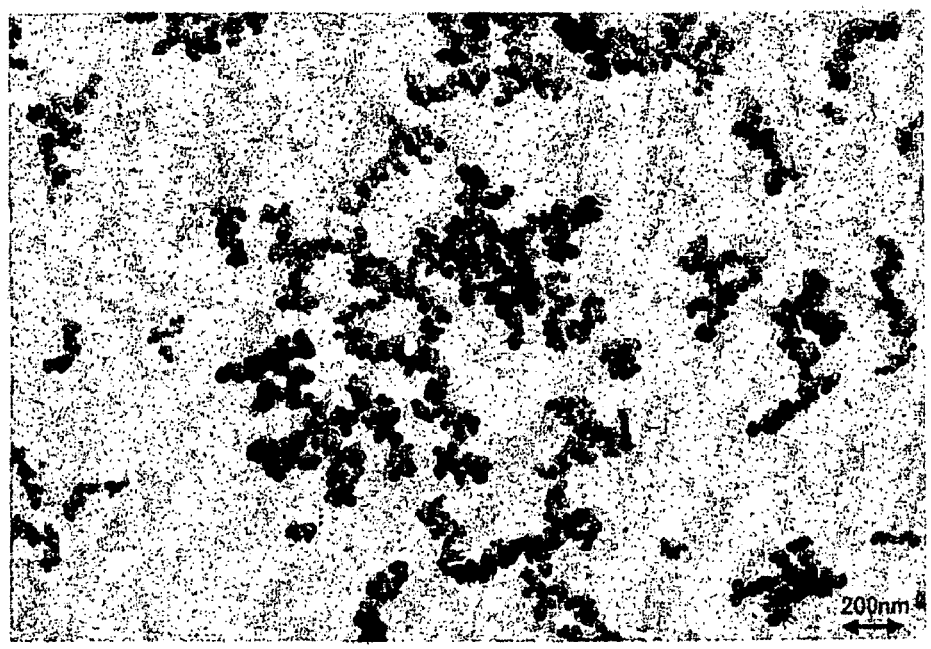
FIG. 3 is an electron micrograph (magnification: 50,000) showing one example of the structure of acetylene black.
Figure 4:
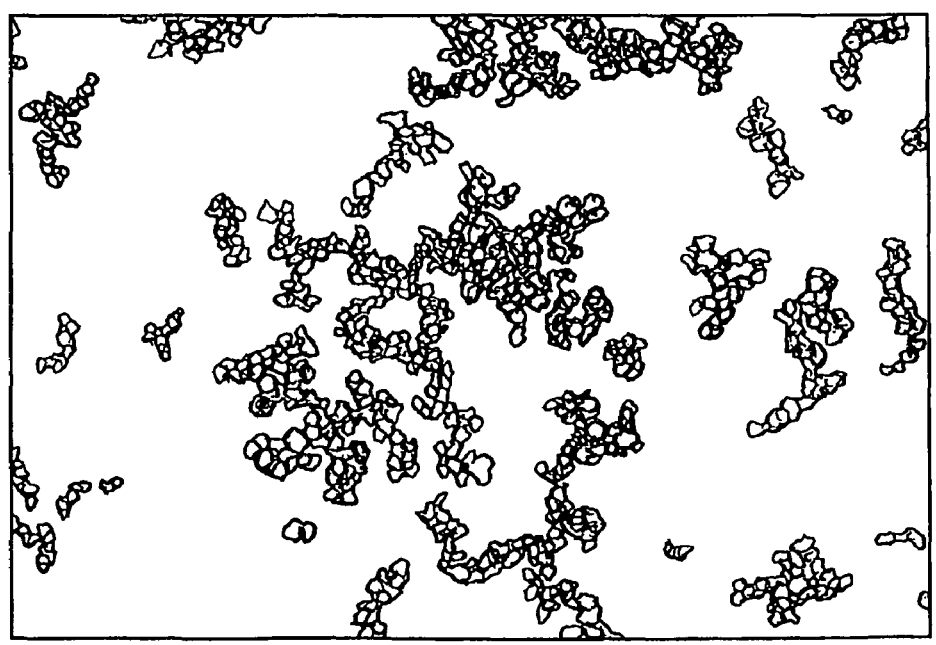
FIG. 4 is a view tracing the electron micrograph of FIG. 3.

Acetylene gas was supplied to a vertical pyrolyzer (overall length: 6 m, diameter: 0.5 m) from an upper portion thereof having a temperature of 2,000° C. in a proportion shown in Table 1 below. On the other hand, gasified benzene containing ferrocene and thiophene, accompanying with hydrogen gas, was supplied to the pyrolyzer from a further upper portion thereof having a temperature of 1,000° C. in proportions shown in Table 1 below. Carbon black formed was collected from a bag filter directly connected to a bottom portion of the pyrolyzer. Carbon blacks obtained in Example 1 and Comparative Example were observed with a transmission electron microscope to observe the respective structure. The results obtained are shown in FIGS. 1 and 3.

TABLE 1

|  | Unit | Example 1 | Example 2 | Example 3 | Comparative Example |
|---|---|---|---|---|---|
| Acetylene | m3/hr | 16 | 15 | 15 | 16 |
| Benzene | kg/hr | 3.7 | 1.7 | 5.2 | 0 |
| Ferrocene | kg/hr | 0.3 | 0.2 | 0.4 | 0 |
| Thiophene | kg/hr | 0.05 | 0.03 | 0.07 | 0 |

To evaluate the conductivity-imparting ability of carbon blacks obtained in Examples 1 to 3 and Comparative Example, the respective resin composition was prepared, and its volume resistivity was measured, as follows.

The carbon blacks (Examples 1 to 3) according to the present invention have excellent conductivity-imparting ability and flowability as compared with acetylene black obtained in the Comparative Example. Further, it is apparent from the comparison between Experiment 2 and Experiment 8 that the carbon black of the present invention is also superior to KETJEN BLACK (Ketjen Black International Co.)

The carbon black or carbon black powder according to the present invention can be also used as coating compositions, conducting agents for battery (primary battery, secondary battery, fuel cell or capacitor), antistatic agents or conducting agents for conducting papers, in addition to conductivity-imparting agents for resins and rubbers.

INDUSTRIAL APPLICABILITY

Accordingly, a carbon black having excellent conductivity-imparting ability, a method for producing the same, and a conductive composition containing the same are provided.

The invention claimed is:

1. A carbon black comprising a chain body which comprises (1) a region of spherical carbon particles and (2) a region of rod-shaped carbon particles, the region (1) and the region (2) being connected.

2. The carbon black as claimed in claim 1, wherein the region of spherical carbon particles comprises acetylene black, and the region of rod-shaped carbon particles comprises a carbon black other than acetylene black.

3. A carbon black powder comprising at least two distinct carbon blacks wherein one of the carbon blacks in said carbon black powder is a carbon black comprising a chain body which comprises (1) a region of spherical carbon particles and (2) a region of rod-shaped carbon particles, the region (1) and the region (2) being connected.

4. The carbon black powder as claimed in claim 3, wherein said carbon black comprising a chain body which comprises (1) a region of spherical carbon particles and (2) a region of rod-shaped carbon particles is present in an amount of 10% by weight or more based on the weight of the carbon black powder.

5. A composition comprising at least one resin and/or at least one rubber, and the carbon black as claimed in claim 1 compounded therewith.

6. A composition comprising at least one resin and/or at least one rubber, and the carbon black powder as claimed in claim 3 compounded therewith.

* * * * *